US010713031B2

United States Patent
Iyer et al.

(10) Patent No.: US 10,713,031 B2
(45) Date of Patent: *Jul. 14, 2020

(54) ENFORCING SECURITY POLICIES FOR SOFTWARE CONTAINERS

(71) Applicant: International Business Machines Corporation, Armonk, NY (US)

(72) Inventors: Sreekanth R. Iyer, Bangalore (IN); Kaushal K. Kapadia, Ashok Nagar (IN); Ravi K. Muthukrishnan, Bangalore (IN); Nataraj Nagaratnam, Cary, NC (US); Sulakshan Vajipayajula, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/211,319

(22) Filed: Dec. 6, 2018

(65) Prior Publication Data

US 2019/0114161 A1 Apr. 18, 2019

Related U.S. Application Data

(63) Continuation of application No. 15/097,313, filed on Apr. 13, 2016, now Pat. No. 10,255,054.

(51) Int. Cl.
| | |
|---|---|
| *G06F 17/00* | (2019.01) |
| *H04L 29/06* | (2006.01) |
| *G06F 8/61* | (2018.01) |
| *G06F 21/44* | (2013.01) |
| *G06F 21/57* | (2013.01) |

(52) U.S. Cl.
CPC ............. *G06F 8/63* (2013.01); *G06F 21/44* (2013.01); *G06F 21/57* (2013.01); *G06F 21/577* (2013.01); *G06F 2221/033* (2013.01); *G06F 2221/2101* (2013.01)

(58) Field of Classification Search
CPC .......... G06F 21/572; G06F 8/63; G06F 21/44; G06F 21/629; G06F 2221/033
USPC .......................................................... 726/1
See application file for complete search history.

(56) References Cited

U.S. PATENT DOCUMENTS

| | | | |
|---|---|---|---|
| 9,122,562 B1 | 9/2015 | Stickle | |
| 9,703,977 B2 * | 7/2017 | Achutha | ............. G06F 21/6218 |
| 9,720,709 B1 | 8/2017 | Stickle | |
| 2007/0271618 A1 * | 11/2007 | Chao | ................... G06F 21/6218 |
| | | | 726/27 |
| 2009/0099882 A1 * | 4/2009 | Karabulut | .............. G06Q 10/06 |
| | | | 713/152 |

(Continued)

OTHER PUBLICATIONS

Yu Peng; Secure Communication and Access Control for Web Services Container; IEEE: 2006; p. 1-4.*

(Continued)

*Primary Examiner* — Monjur Rahim
(74) *Attorney, Agent, or Firm* — Nolan M. Lawrence

(57) ABSTRACT

In response to an attempt to install an instance of a container in a production environment, a set of security criteria associated with the container and features of the production environment are compared. Based on the comparison, a determination is made as to whether the features of the production environment satisfy the set of security criteria.

12 Claims, 9 Drawing Sheets

(56) References Cited

U.S. PATENT DOCUMENTS

| | | | | |
|---|---|---|---|---|
| 2009/0222880 A1* | 9/2009 | Mayer | | G06F 21/604 |
| | | | | 726/1 |
| 2012/0185913 A1* | 7/2012 | Martinez | | G06F 9/455 |
| | | | | 726/1 |
| 2013/0298183 A1* | 11/2013 | McGrath | | G06F 9/455 |
| | | | | 726/1 |
| 2014/0026195 A1* | 1/2014 | Marshall | | G06F 21/16 |
| | | | | 726/4 |
| 2014/0033271 A1* | 1/2014 | Barton | | H04L 67/10 |
| | | | | 726/1 |
| 2014/0096270 A1* | 4/2014 | Beckwith | | G06F 21/6209 |
| | | | | 726/30 |
| 2014/0189777 A1* | 7/2014 | Viswanathan | | H04L 63/105 |
| | | | | 726/1 |
| 2014/0215552 A1* | 7/2014 | Abnous | | G06F 21/629 |
| | | | | 726/1 |
| 2015/0012339 A1* | 1/2015 | Onischuk | | G07C 13/00 |
| | | | | 705/12 |
| 2015/0040182 A1* | 2/2015 | Chambers | | G06F 21/10 |
| | | | | 726/1 |
| 2016/0381075 A1* | 12/2016 | Goyal | | H04L 63/20 |
| | | | | 713/176 |
| 2017/0180423 A1* | 6/2017 | Nimmagadda | | H04L 63/0263 |
| 2017/0212830 A1* | 7/2017 | Thomas | | G06F 8/63 |
| 2017/0300697 A1 | 10/2017 | Iyer et al. | | |

OTHER PUBLICATIONS

Docker, "What is Docker?", Understand how Docker works and how you can use it, Last Printed Feb. 8, 2016, 10 pages https://www.docker.com/what-docker.

Twistlock, "Security, built for containers", Purpose-built Container Security, Last Printed Feb. 8, 2016, 6 pages, https://www.twistlock.com/.

Mell et al., "The NIST Definition of Cloud Computing", National Institute of Standards and Technology, U.S. Department of Commerce, Special Publication 800-145, 7 pages.

KIMIC, "IBM Delivers Docker Based Container Services", IBM Bluemix Dev, Jun. 22, 2015, 6 pages https://developer.ibm.com/bluemix/2015/06/22/ibm-containers-on-bluemix/.

Lee, T., "Using Mandatory Integrity to Enforce "Commercial" Security", IEEE, 1988, pp. 140-146.

IBM, List of IBM Patents or Patent Applications Treated as Related, Dec. 5, 2018, 2 pages.

* cited by examiner

ENFORCING SECURITY POLICIES FOR SOFTWARE CONTAINERS

BACKGROUND

The present disclosure relates generally to the field of data processing, and, more particularly, to implementing security policies associated with software containers.

Computer virtualization has been utilized in a variety of forms in modern computing. Early operating systems provided memory virtualization, later computing systems provided entire computer virtualization through various Virtual Machine (VM) technologies and hypervisors.

SUMMARY

Embodiments of the present disclosure include a method, computer program product, and system. In response to an attempt to install an instance of a container in a production environment, a set of security criteria associated with the container and features of the production environment are compared. Based on the comparison, a determination is made as to whether the features of the production environment satisfy the set of security criteria.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
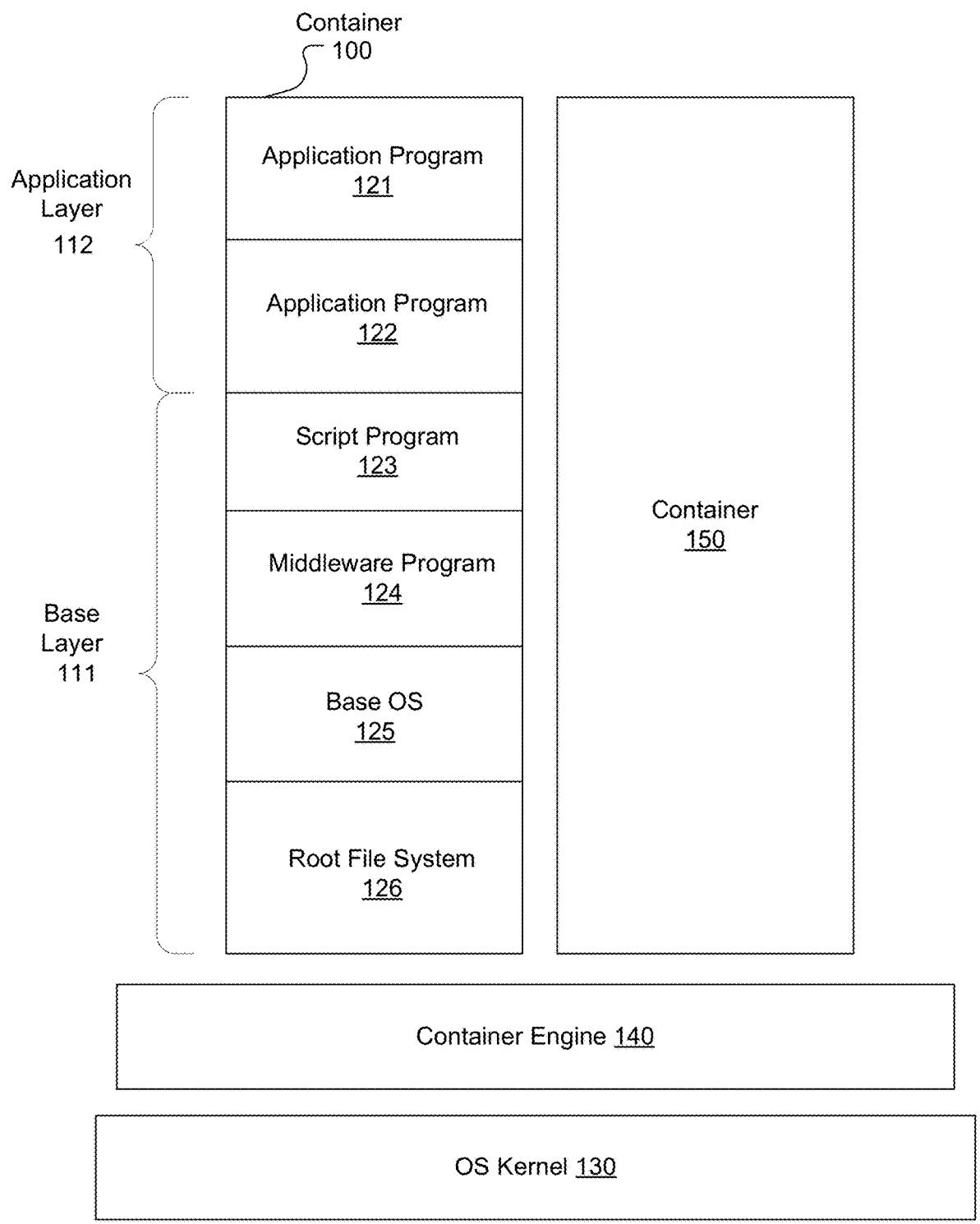
FIG. 1 illustrates a diagram of an example container, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and in particular to implementing security policies associated with software containers. While the present disclosure is not necessarily limited to such applications, various aspects of the disclosure may be appreciated through a discussion of various examples using this context.

Software containers ("containers") have emerged as a form of virtualization that allows isolated execution of a program with regard to other programs of a computer. A Linux Container (LXC) is an example of a software container. Other software container technologies includes jails, workload partitions, or containers implemented in other types of operating systems.

Containers generally incorporate programs. Executing a container entails running the programs within the container on a computer. More specifically, containers may execute by utilizing the environment and programming interfaces of an underlying (i.e., not included within the container) host operating system (OS) of the computer. A host OS (e.g., a Linux operating system or Linux kernel) may enable, initiate, or control execution of the programs within the container. The host OS may also isolate the operations of programs within the container from other programs executing outside of the container and from resources of the computer not required by the programs within the container. A host OS may run a number of different containers, or a number of instances of the same container, on a single computer.

A container may utilize a complete host OS, or may utilize only a host OS kernel. Programs executing within a container may share the host OS (or OS kernel) with other programs executing on the same computer, including programs executing in other containers. Containers may offer many features of VMs while requiring less memory (by virtue of not requiring a complete instance of an operating system for each instance of a container), and executing with lower system overhead (by virtue of directly utilizing the underlying operating system kernel, versus an independent operating system in a VM-hosted environment).

Recently, software platforms, such as Docker, have arisen that allow developers and administrators to build, export, and run applications in containers with relative ease. These platforms may also reduce the difficulties and compatibility concerns that arise when shifting a container from a development environment to one or more production environments. In some situations, however, problems may still arise. In particular, when allowing a container to be deployed in a production environment there may be a need to ensure that the production environment has adequate security features given the specific security requirements for that container.

In some embodiments of the present disclosure, a container developer or other user may be able to dictate and enforce the security requirements that must be in place when the container is installed in a production environment. This may include production environments over which the container developer or other user has no control or with which the user has no association (e.g., a public cloud platform operated by a third party that is independent of the user). In some embodiments, this may involve causing the features of a production environment to be mapped (e.g., enumerated, discovered) and then compared with security criteria associated with a particular container to be installed in the production environment. The installation may be allowed to complete in situations where the security criteria are satisfied. If the security criteria are not satisfied, then the installation may not be allowed to be completed. In some embodiments, unsatisfied security criteria may be analyzed in view of the features of the production environment in order to determine whether added security features may be used to alleviate security risks associated with the unsatisfied security criteria.

Referring now FIG. 1, shown is a diagram of an example container 110, in accordance with embodiments of the present disclosure. In some embodiments, the container 110 may be a file that includes or references components, which may themselves be other files that contain programs and data. Further, in some embodiments, a separate, but still associated, file external to the container 110 may reference the components of the container 110. As shown, container 110 includes application programs 121 and 122, a script program 123, middleware programs 124, a base operating system 125 (i.e., components of an OS not included in an OS kernel), and a root file system 126. The components of the container 110 may be designed to execute utilizing a particular, underlying operating system (or operating system kernel), such as OS kernel 130.

Different components of the container 110 may be encapsulated within layers. Together these layers may form the completed container 110. As shown, container 110 has a base layer 111 and application layer 112. In some embodiments, many other layers or different divisions of the depicted layers 111 and 112 are possible. A layer may encapsulate all the program and data components necessary to perform a particular function within the environment on which the container executes.

In some embodiments, layers of a container may be combined into a hierarchical stack wherein one layer may be defined with reference to one or more layers below that layer in the stack. Components of one layer may replace, or may augment, components of a lower layer. For example, base layer 111 may include a component of OS kernel 130, such that the component included in base layer 111 replaces or substitutes for the equivalent component of OS kernel 130.

In some embodiments, additional programs may be incorporated between a container and the OS kernel (or Host OS) on which it operates. For example, as depicted, container engine 140 is incorporated between container 100 and OS kernel 130. As used herein, a container engine may refer to a container management program that is used to manage the building and execution of containers. Furthermore, in some embodiments, multiple containers may run on a single host OS and/or a single container engine. For example, as depicted, a second container 150 also runs on OS kernel 130 and container engine 140.

In some embodiments, a container may effectively be stored as a container image. In addition, each layer of the container may also be an image that is combined with the other layer images to make the container image. As viewed by external programs and human users, an image may be simply a file. An image may also be an isolated portion of a file system. Files within an image may include program files (e.g., script files, source program files, or binary executable files), data files, and directory structures that include those program or data files.

In some embodiments, a container may refer to an executable (e.g., run-time) entity that references a container image and establishes a context for running a set of programs using components of the container image. Furthermore, as used herein, an instance of a container may be deemed installed when it is utilizing components of a particular container image.

Figure 2:
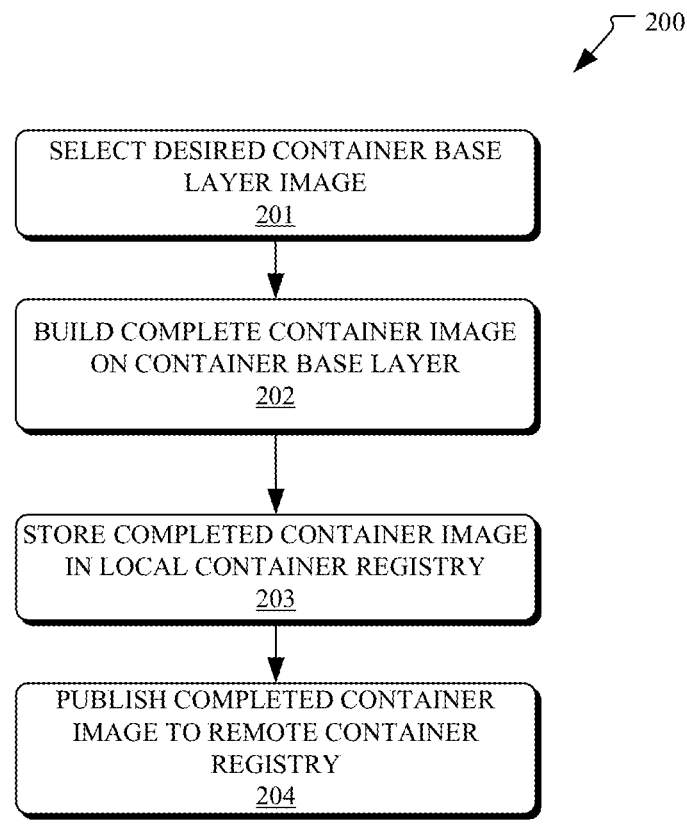
FIG. 2 illustrates a flow diagram of an example method for developing a container image for use in production environments, in accordance with embodiments of the present disclosure.

Referring now to FIG. 2, shown is a flow diagram of an example method 200 for developing a container image for use in production environments, in accordance with embodiments of the present disclosure. In some embodiments, operations of the method 200 may be performed by a user (e.g., software developer), a computer, or a combination thereof. In some embodiments, operations of the method 200 may be performed in a development environment. The method may begin at operation 201, wherein a desired container base layer image is selected. In some embodiments, the base layer image (and other layer images) may be obtained from a file (or source code) repository. The base layer image (and other layer images) may be a pre-designed standardized layer that is used by multiple developers for a wide variety of different containers.

Per operation 202, a completed container image may be built (e.g., created) on the container base layer. This building may be performed manually, for example, by a software developer utilizing a user interface to create the container image and/or a configuration file describing the container. In some embodiments, the user interface may be part of a container manager program (e.g., a user interface associated with a container engine). During the build, the software developer may execute commands that sequentially assemble a container, such as by assembling layers of the container from the lowest to highest in a stack of layers. Also, the software developer may associate a file with a container by direct inclusion of the file within a layer incorporated within the container. Alternatively, associating a file with a container may be accomplished by including a reference in the container image to a location of the file.

After completion of the build, and per operation 203, the completed container image may be stored in a local container registry. This local container registry may be accessible only to the software developer and the container images stored therein may not be accessible (or deemed ready) for use in production environments. Per operation 204, the software developer may publish the completed container image to one or more remote container registries. In some embodiments, these remote registries may be used to hold multiple containers that are available to users for use in production environments. Furthermore, in some embodiments, a remote registry may be accessible to only a particular organization (e.g., an enterprise that employs the developer), or may be generally accessible (e.g., to a community of software developers, who may be members of the same or a variety of different organizations).

Figure 3:
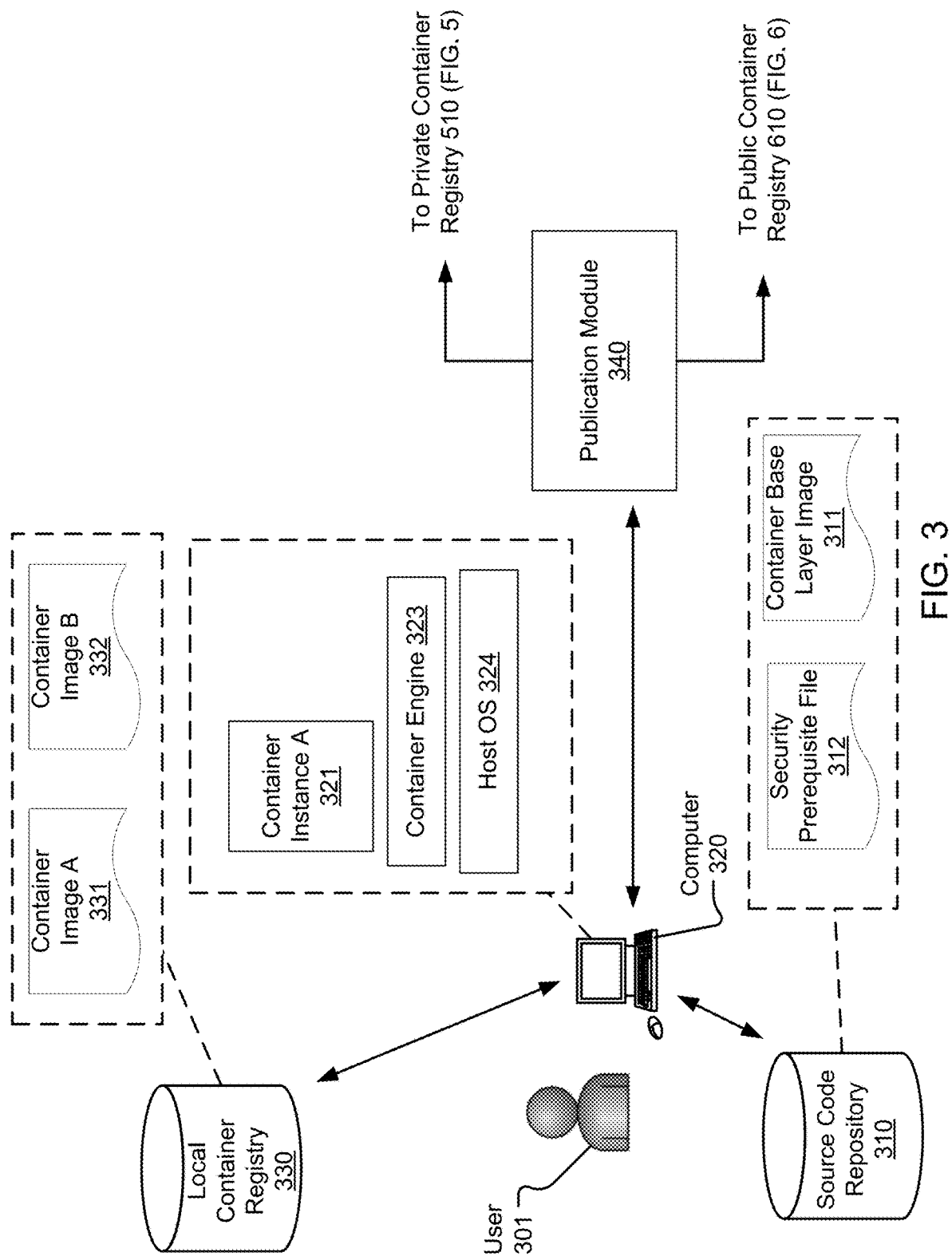
FIG. 3 illustrates a block diagram of an example container development environment, in accordance with embodiments of the present disclosure.

Referring now to FIG. 3, shown is a block diagram of an example container development environment, in accordance with embodiments of the present disclosure. In the depicted example, a user 301 (e.g., a software developer) uses a computer 320 to develop containers for use in production environments. The user 301 employs a container engine 323 operating on the host OS 324 of his computer 320 to manage his container builds. To begin, once an instance of the container engine 323 is executing on the computer 320, the user 301 obtains a container base layer image 311 from the source code repository 310. The user 301 then adds additional layer images (not shown) onto the base layer image 311 to create a completed container instance A 321. This container is then stored, in this example, in a local container registry (e.g., local image registry) 330 as container image A 331. An additional container image B 332 is also depicted as being stored in the local container registry 330.

When the user 301 desires to provide containers to others for production use, a publication module 340 (located on the computer 320) obtains the container image A 331 and container image B 332 from the local container registry 330 and pushes them to one or more remote container registries. In the depicted example, these remote container registries include a private container registry 510 and a public container registry 610.

In some embodiments, the user 301 may desire to associate one or more security prerequisite files 312 with container images 331 and 332 before publishing them via the publication module 340. This may be done, for example, by associating the security prerequisite file 312 into the container instance A 321 during the build of the that container (e.g., by incorporating the security prerequisite file 312 within a layer of the container). This may also be done, for example, by associating the security prerequisite file 312 with the container instance A 321 as the container is being published (e.g., by transmitting the security prerequisite file 312 with the container image A 331) to a remote container registry.

By associating a security prerequisite file 312 with a container image, a user 301 may be able to dictate policies on a wide variety of security matters within production environments where the containers are installed. For example, security policies may relate to network security (e.g., container isolation), file system security (e.g., integrity checking), and event logging within the production environment. For a specific example, a security prerequisite file 312 may require that, within the production environment, traffic coming into the container only be allowed in through a specific port. For another specific example, a security prerequisite file 312 may require that the production environment have certain features implemented that will protect the container from SQL injections, Denial-of-Service attacks, or other cyberattacks.

Figure 4:
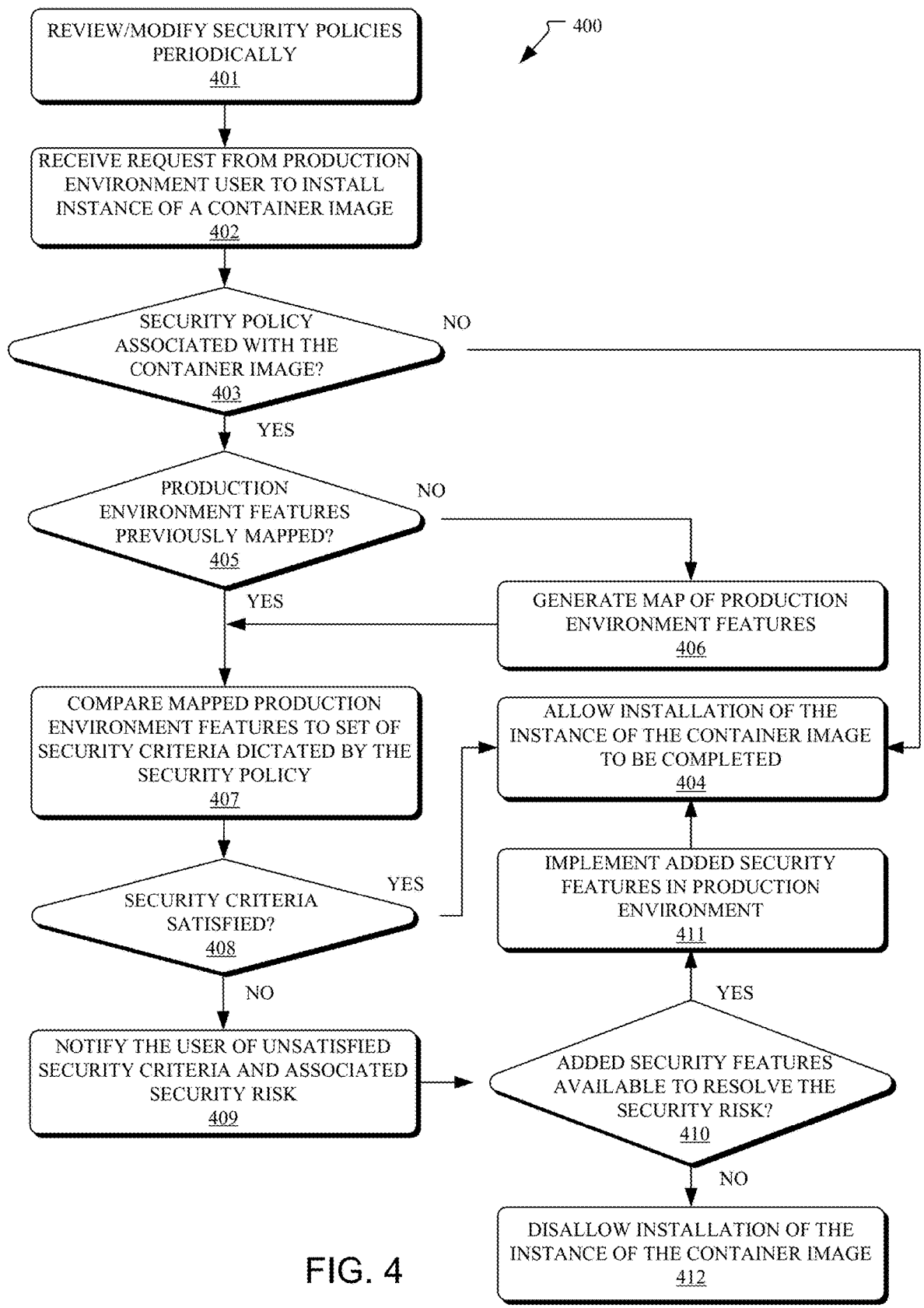
FIG. 4 illustrates a flow diagram of an example method for enforcing security policies associated with container instances, in accordance with embodiments of the present disclosure.

Referring now to FIG. 4, shown is a flow diagram of an example method 400 for enforcing security policies associated with container instances, in accordance with embodiments of the present disclosure. In some embodiments, operations of the method 400 may be performed by a user (e.g., security administrator), a computer, or a combination thereof. In some embodiments, operations of the method 400 may be performed within a production environment, for example, by an installation manager program. The method 400 may begin at operation 401, wherein security policies associated with container images stored in registries are periodically reviewed and, in some cases, modified. These modifications may be made in response to a variety of new conditions. For example, these conditions may include changes in corporate security protocols or security updates made in response to newly discovered vulnerabilities.

Per operation 402, a request is received from a production environment user to install an instance of a specific container in his production environment. In some embodiments, the production environment user may be a computer or application running within the production environment, rather than a human user. Per operation 403, a determination is made as to whether there is a security policy currently associated with an image of the requested container. If not, then, per operation 404, the installation of the container in the production environment is allowed without any security check of that environment. If, however, there is a security policy associated with the image, then, per operation 405, another determination may be made as to whether the features of the production environment have been previously mapped. If no such map exists, then, per operation 406, a map of production environment features may be generated.

In some embodiments, the production environment map may be designed to include a listing (or table) of aspects of the production environment that are relevant to the relative security of that environment. Specifically, the map may include information about the production environment's operating system, firewalls, security patches, software restriction policies, and public key policies, among other features. It may include a list of security services that are supported in the production environment. In some embodiments, the map may be generated based on an automated audit of the production environment (e.g., one performed by a trusted third-party). In other embodiments, the map may be generated based on information provided by the user of the production environment (e.g., in the form of responses to a security survey). In some embodiments, generating the map may involve enumerating a correlation between a security requirement and a particular feature of the production environment that satisfies the security requirement. In some embodiments, generating the map may involve matching the discovered security settings in the production environment with various security categories. For example, a category may be whether or not the production environment employs a firewall. Thus, the concern may not be the particular type of firewall that the production environment employs but rather whether one is employed at all or whether the production environment (or the organization controlling the production environment) allows the use of a firewall if required by a security policy associated with a container image. This type of category matching may produce less detailed, but perhaps more easily used, maps.

Once the map is generated, per operation 406, or a previously generated map is retrieved, then, per operation 407, the mapped production environment features may be compared to a set of security criteria that are dictated by the security policy associated with the container. Per operation 408, a determination is made as to whether the set of security criteria are satisfied. If so, then, per operation 404, the installation of the container in the production environment is allowed. If at least one of the set of security criteria is not satisfied, then, per operation 409, the user is notified of the unsatisfied security criteria and the security risk posed by this lapse.

Per operation 410, a determination is made as to whether there are added security features available to resolve the identified security risk. In some embodiments, this may involve determining whether features of the production environment can be modified so as to alleviate the risk. For another example, this may involve determining whether a monitoring service is available outside of the production environment and determining whether the user would accept the installation of such a service. In some embodiments, a monitoring service solution may be employed within the production environment but outside of the container being installed. In other embodiments, the monitoring service may be integrated directly into the container.

If a determination is made in operation 410 that no added security features are available (e.g., because the particular security policy does not allow for any deviations from the set of security criteria or because the user does not desire to implement an added security feature after it is identified), then, per operation 412, the installation of the container instance in the production environment is disallowed. Alternatively, if security features are determined to be available in operation 410, then, per operation 411, the added security features may be implemented in the production environment, and, per operation 404, the installation of the container instance may be allowed to be completed. In some embodiments, the added security features may be added and/or adjusted automatically depending on the implemented security policies.

While an example embodiment of the method 400 is described herein, many variants on this method may be possible. For example, in some embodiments, after a user is notified of an unsatisfied security criteria (per operation 409), the user may be able to ignore the risk and proceed with the installation, even against the recommendation of the computer (or installation manager) performing the method. For another example, in some embodiments, a monitoring service may be required within the production environment any time that the container is installed therein. This monitoring service may be used to continuously enforce certain of the security criteria. If the monitoring service detects an unacceptable deviation from the security criteria the container may be automatically shut down and/or uninstalled. For yet another example, in some embodiments, before a second container is linked to an installed container that has an associated security policy, a security audit of the second container may be required. This security audit may include requiring the features second container to be mapped (as described above) and then have that map compared with security criteria in order to determine whether there are any risks involved with linking the second container to the installed container.

Figure 5:
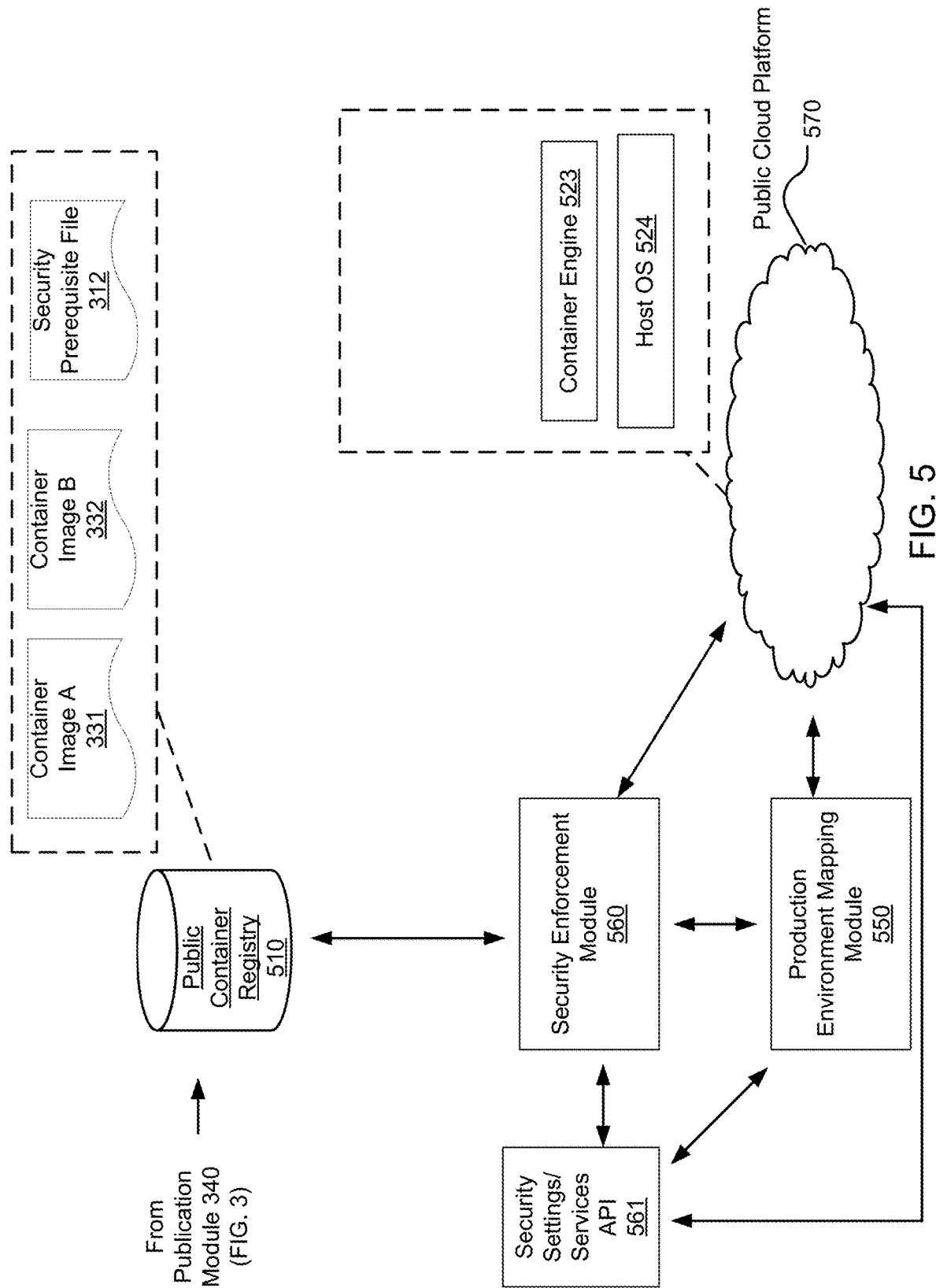
FIG. 5 illustrates a block diagram of an environment including a public registration container and a public production environment, in accordance with embodiments of the present disclosure.

Referring now to FIG. 5, shown is a block diagram of an environment including a public registration container and a public production environment, in accordance with embodiments of the present disclosure. As shown, container image A 331, container image B 332, and security prerequisite file 312 are stored in public container registry 510 after having been received from publication module 340 of FIG. 3. In some embodiments, the public container registry 510 may include many additional container images (e.g., hundreds) and additional security perquisite files received from a variety of different sources.

Also shown are a security enforcement module 560 and a production environment mapping module 550. In some embodiments, these two modules may coordinate to evaluate the security features of production environments (such as public cloud platform 570) that attempt to install container images from public container registry 510. Specifically, the production environment mapping module 550 may be responsible for identifying the relevant features of a production environment under evaluation. In some embodiments, the production environment mapping module 550 may (either directly or through a security settings/services API 561) generate a security map of a production environment based on the features discovered therein. Furthermore, the production environment mapping module 550 may store these security feature maps until they are needed by the corresponding security enforcement module 560. In some embodiments, the environment mapping module 550 may leverage a separate service that is designed to locate the relevant features of the production environment. Furthermore, in some embodiments, the environment mapping module 550 (or an associated service) may use a XML or JSON file to act as a security feature map or to otherwise list relevant features of the production environment. The security enforcement module 560 may be configured to compare features described in a feature map to a set of security criteria dictated by a security prerequisite file associated with a container image to be installed.

Shown as connected to security enforcement module 560, the production environment mapping module 550, and the public cloud platform 570 is the security settings/services API 561. In some embodiments, this API may be used by a computer program that allows individuals (e.g., security administrators) to modify container security criteria, for example, by changing the security prerequisite file with which a particular container image is associated. Furthermore, in some embodiments, the security enforcement module 560 may, either through API 561 or through a direct connection with public cloud platform 570, attempt to enforce security criteria on the public cloud platform 570. This enforcement may involve the security enforcement module 560 either allowing or disallowing the installation of an instance of a container image of the public cloud platform 570 depending on whether security criteria are met. In some embodiments, the interaction between the security enforcement module 560 and the public cloud platform 570 may be taken a step further in that the security enforcement module 560 (either directly or through API 561) may be able to make modifications to the settings of features within the public cloud platform 570 in order to ensure that the security criteria are met and/or are continued to be maintained. This may involve, for example, the security enforcement module 560 modifying firewall settings in the cloud platform 570 in response to determining that the settings do not meet security criteria without the modification.

An example scenario that may occur in the environment of shown in FIG. 5 will now be described. In this scenario, a user (e.g., human user or a computer program) is operating within the public cloud platform 570 and has access to an established host OS 524 and container engine 523. The user requests installation of an instance of container image A 331 on the container engine 523. Upon receiving this request, the security enforcement module 560 determines that container image A 331 is associated with security prerequisite file 312. Accordingly, the security enforcement module 560 obtains the security prerequisite file 312 from the public container registry 510 and also obtains a feature map of the public cloud platform 570 from the production environment mapping module 550. The security enforcement module 560 then compares the set of security criteria included in the security prerequisite file 312 with the features of the public cloud platform 570 (as described in the feature map).

Continuing this example scenario, there are several different outcomes that can result based on this security comparison. One potential outcome is that the security enforcement module 560 could determine that the features of the public cloud platform 570 satisfy the security criteria. In this situation, the user would be allowed to install container A and an instance of container A would begin executing on the container engine 523. Another potential outcome is the security module could determine that the features of the public cloud platform 570 do not satisfy at least one of the security criteria. In this situation, depending on the security settings in place, the security enforcement module 560 could respond to this failure by disallowing the installation of the container A or by allowing the installation only after added security features (e.g., a monitoring feature) are employed within the public cloud platform 570. In another embodiment, the security enforcement module 560 could respond to this failure by automatically modifying features within the public cloud platform 570 so that the security criteria are thereafter met.

Figure 6:
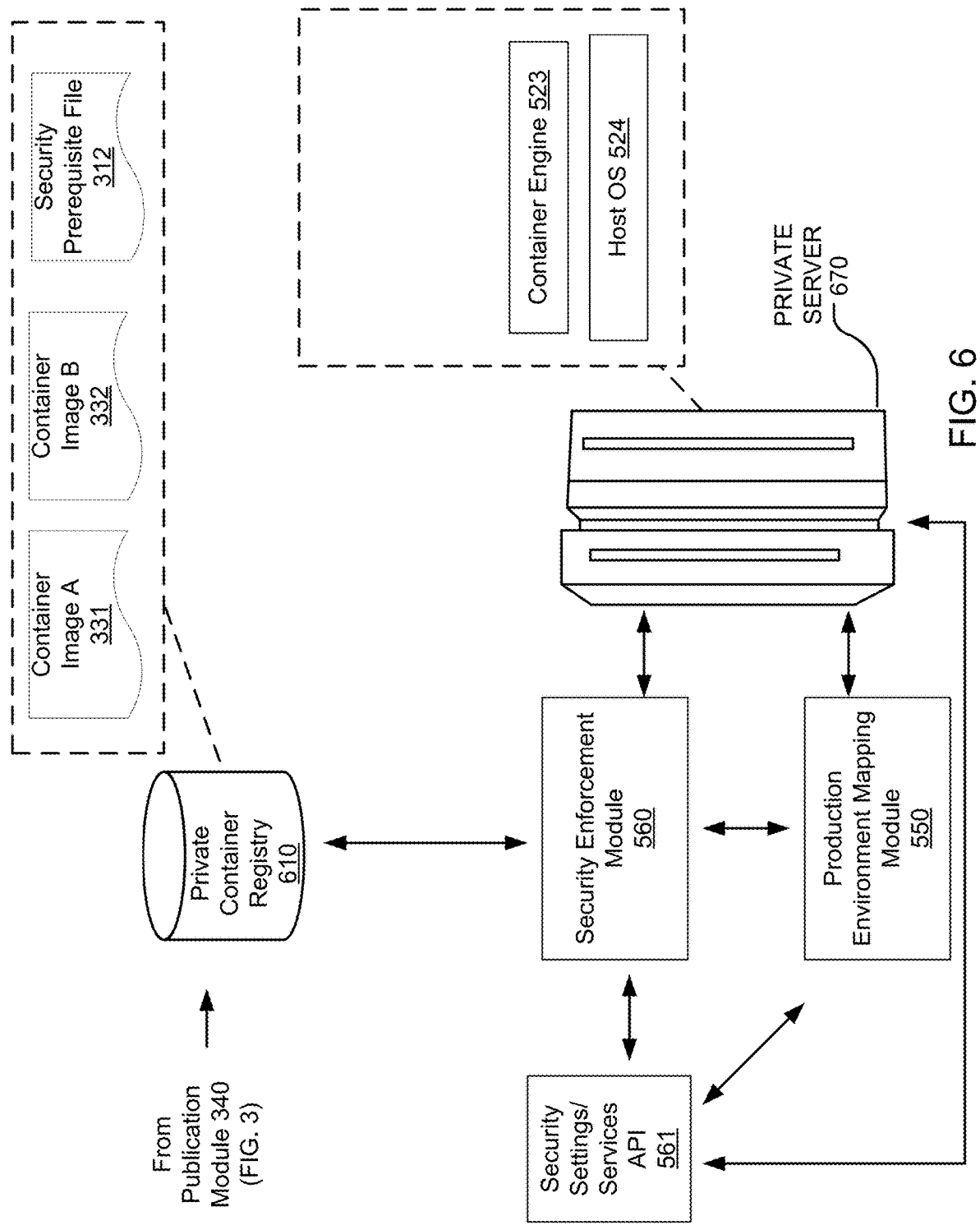
FIG. 6 illustrates an environment including a private registration container and a private production environment, in accordance with embodiments of the present disclosure.

Referring now to FIG. 6, shown is an environment including a private registration container and a private production environment, in accordance with embodiments of the present disclosure. The environment of FIG. 6 may be employed, for example, in a corporate setting or other environment where the publication and use of the container images is limited to those within a select group of related users. As compared to the environment shown in FIG. 5, the environment of FIG. 6 includes a private server 670 (as an alternative to public cloud platform 570) and a private container registry 610 (as an alternative to public container registry 510). In some embodiments, the security criteria associated with the container images stored in the private container registry 610 may be adjusted by a user such as a corporate system administrator that utilizes the security settings API 561. In this way the system administrator may be able to dynamically adjust security policies depending on new and changing security risks that he perceives.

Figure 7:
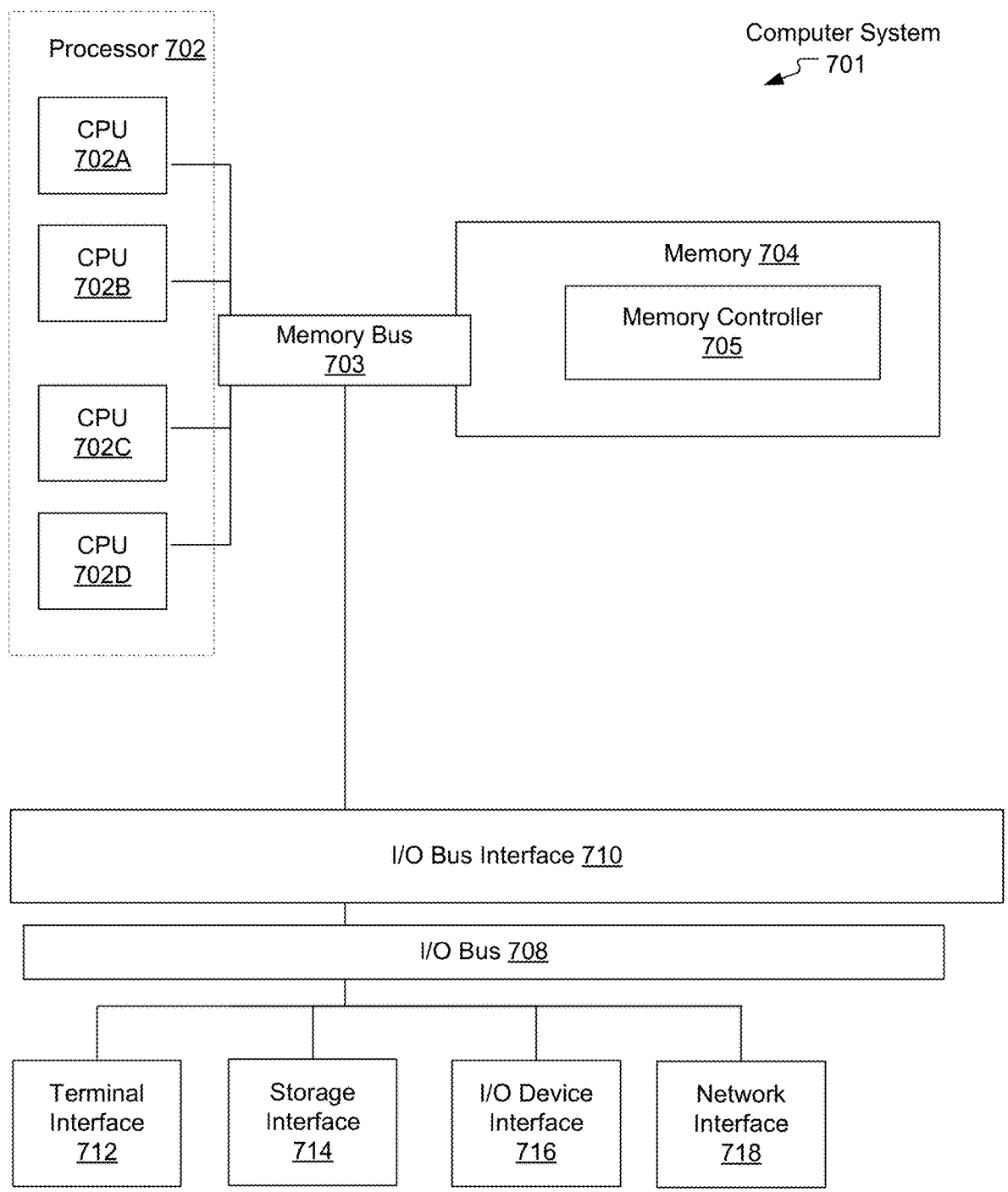
FIG. 7 illustrates a high-level block diagram of an example computer system that may be used in implementing embodiments of the present disclosure.

Referring now to FIG. 7, shown is a high-level block diagram of an example computer system (i.e., computer) 701 that may be used in implementing one or more of the methods or modules, and any related functions or operations, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 571 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
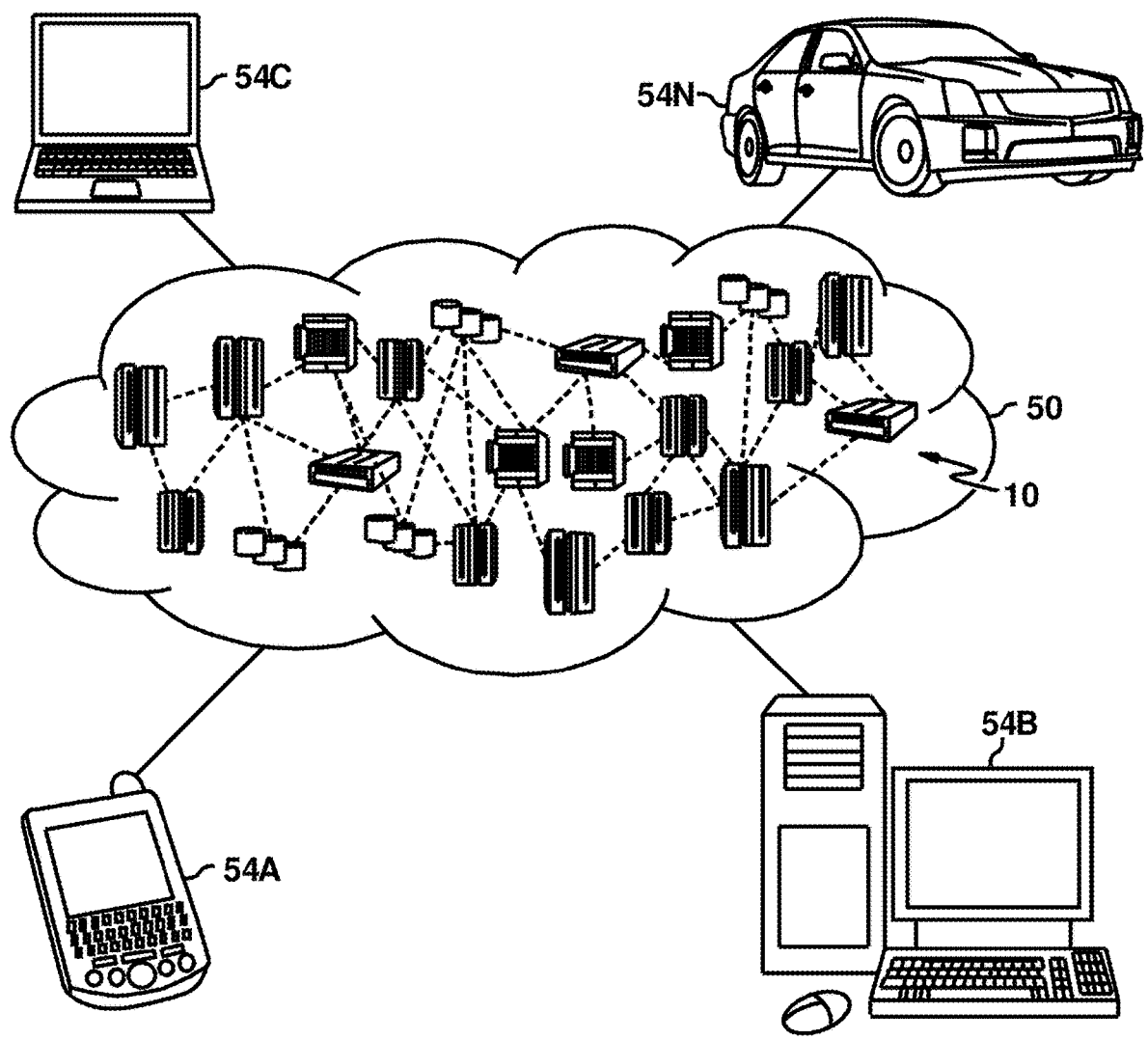
FIG. 8 illustrates a diagram of a cloud computing environment, in accordance with embodiments of the present disclosure.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 9:
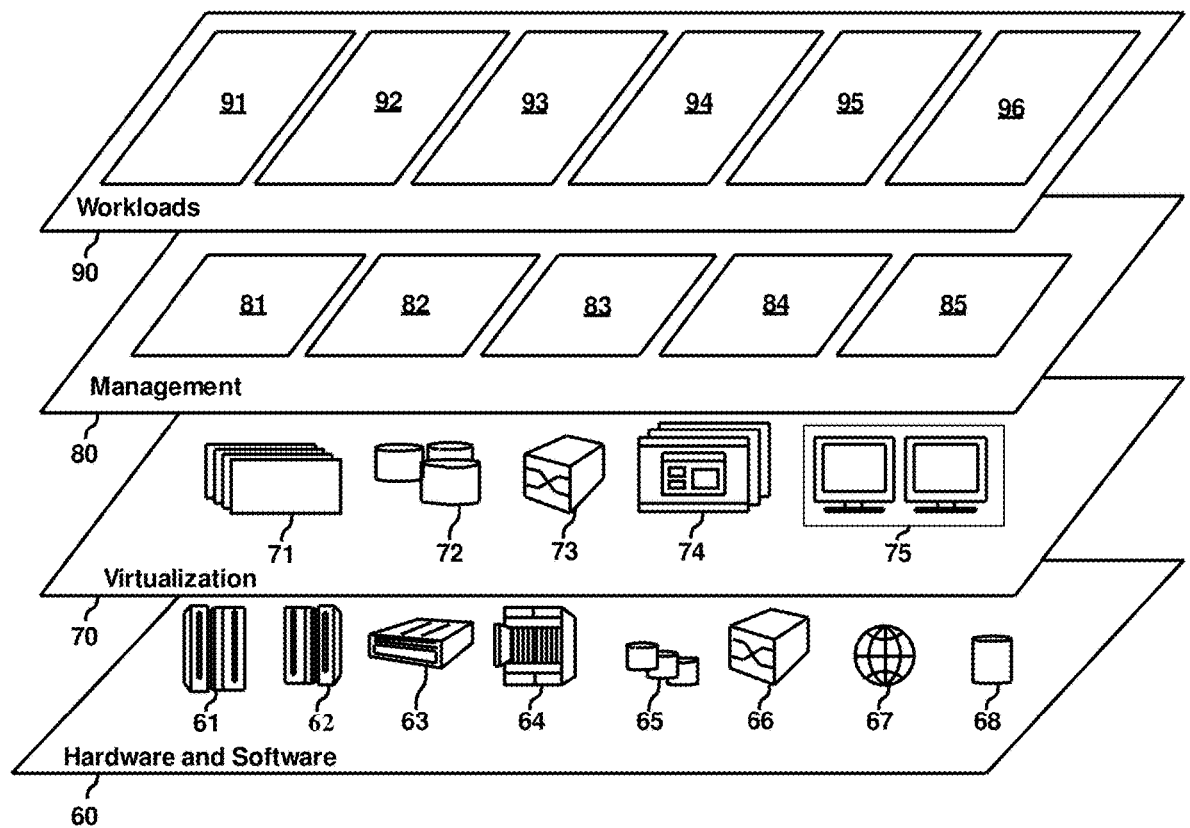
FIG. 9 illustrates a diagram of abstraction model layers, in accordance with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
    comparing, by a hardware processor and in response to an attempt to install an instance of a container image in a production environment, a set of security criteria associated with the container image and features of the production environment, wherein the container instance comprises a run-time entity that is configured to utilize referenced components of the container image while executing upon on operating system kernel of the production environment, wherein the comparing the set of security criteria associated with the container image and the features of the production environment comprises comparing the set of security criteria to a pre-established map of the security functionalities of the production environment, wherein the pre-established map is created based on an audit of the features of the production environment, and wherein the comparing the set of security criteria to the pre-established map of the security functionalities of the production environment comprises:
        generating, based on the audit, a listing of the features of the production environment; and
        enumerating, for each particular security criterion of the set of security criteria, correlations between the particular security criterion and corresponding particular listed features that satisfy that particular security criterion; and
    determining, based on the comparing, whether the features of the production environment satisfy the set of security criteria.

2. The method of claim 1, wherein the attempt to install the container instance includes obtaining the container image from a container registry that includes a plurality of different container images, further comprising:
    receiving, at the container registry, the container image, wherein the container image as received includes an associated security prerequisite file that includes the set of security criteria.

3. The method of claim 1, further comprising:
    determining that the features of the production environment do not satisfy at least one criterion of the set of security criteria;
    identifying, based on an identity of the not satisfied at least one criterion, a risk associated with the installation of the container instance; and
    providing the identified risk to a user that is attempting the installation.

4. A computer program product comprising a computer readable storage medium, wherein the computer readable storage medium is not a transitory signal per se, the computer readable storage medium having program instructions embodied therewith, the programs instructions configured, when executed by at least one computer, to cause the at least one computer to perform a method comprising:
    comparing, by a hardware processor and in response to an attempt to install an instance of a container image in a production environment, a set of security criteria associated with the container image and features of the production environment, wherein the container instance comprises a run-time entity that is configured to utilize referenced components of the container image while executing upon on operating system kernel of the production environment, wherein the comparing the set of security criteria associated with the container image and the features of the production environment comprises comparing the set of security criteria to a pre-established map of the security functionalities of the production environment, wherein the pre-established map is created based on an audit of the features of the production environment, and wherein the comparing the set of security criteria to the pre-established map of the security functionalities of the production environment comprises:
        generating, based on the audit, a listing of the features of the production environment; and
        enumerating, for each particular security criterion of the set of security criteria, correlations between the particular security criterion and corresponding particular listed features that satisfy that particular security criterion; and
    determining, based on the comparing, whether the features of the production environment satisfy the set of security criteria.

5. The computer program product of claim 3, wherein the attempt to install the container instance includes obtaining the container image from a container registry that includes a plurality of different container images, and wherein the method further comprises:
    receiving, at the container registry, the container image, wherein the container image as received includes an associated security prerequisite file that includes the set of security criteria.

6. The computer program product of claim 3, wherein the method further comprises:
    determining that the features of the production environment do not satisfy at least one criterion of the set of security criteria;
    identifying, based on an identity of the not satisfied at least one criterion, a risk associated with the installation of the container instance; and
    providing the identified risk to a user that is attempting the installation.

7. A system comprising:
    at least one memory; and
    at least one processor in communication with the at least one memory, the at least one processor configured to obtain instructions from the memory that cause the at least one processor to perform a method comprising:

comparing, in response to an attempt to install an instance of a container image in a production environment, a set of security criteria associated with the container image and features of the production environment, wherein the container instance comprises a run-time entity that is configured to utilize referenced components of the container image while executing upon on operating system kernel of the production environment, wherein the attempt to install the container instance includes obtaining the container image from a container registry that includes a plurality of different container images, wherein the container image as received at the container registry includes an associated security prerequisite file that includes the set of security criteria, wherein the comparing the set of security criteria associated with the container image and the features of the production environment comprises comparing the set of security criteria to a pre-established map of the security functionalities of the production environment, and wherein the pre-established map is created based on an audit of the features of the production environment;

determining, based on the comparing the set of security criteria associated with the container image and the features of the production environment, whether the features of the production environment satisfy the set of security criteria;

determining that the features of the production environment do not satisfy at least one criterion of the set of security criteria;

identifying, based on an identity of the not satisfied at least one criterion, a risk associated with the installation of the container instance;

providing an added security feature to the production environment to alleviate the identified risk; and allowing, based on the added security feature, the attempted installation to be completed.

8. The system of claim 7, wherein the set security criteria dictates container isolation security polices within the production environment by requiring that the features of the production environment be configured to allow traffic into the container instance only through a specific port.

9. The system of claim 7, wherein the providing the added security feature comprises installing a monitoring service within the production environment but outside of the container instance.

10. The system of claim 9, wherein the installed monitoring service is configured to continuously enforce at least one security criterion of the set of security criteria by automatically shutting down the container instance, after the attempted installation is completed, in response to detecting a deviation from that at least one security criterion.

11. The system of claim 7, wherein the security prerequisite file is incorporated into the container image as received.

12. The system of claim 7, wherein the security criteria are associated with the container image by a developer of the container during a build of the container image, and wherein the developer is not associated with the production environment.

* * * * *